Figure 1:
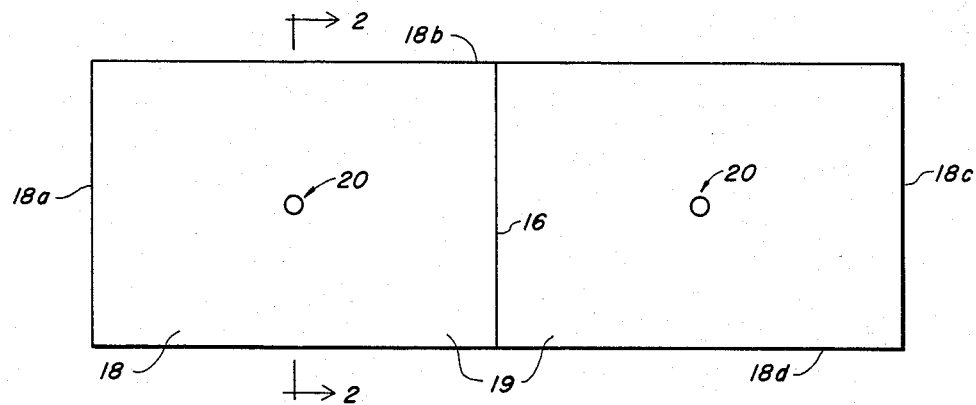

United States Patent [19]

Epstein et al.

[11] Patent Number: 4,507,857

[45] Date of Patent: Apr. 2, 1985

[54] ELECTROCHEMICAL CELL

[75] Inventors: James Epstein, Sharon; Nikola Marincic, Winchester, both of Mass.

[73] Assignee: Battery Engineering Inc., Hyde Park, Mass.

[21] Appl. No.: 506,786

[22] Filed: Jun. 22, 1983

[51] Int. Cl.³ .............................................. H01M 6/04
[52] U.S. Cl. .................................. 29/623.2; 29/623.1; 228/901; 429/181
[58] Field of Search .......................... 29/623.1–623.5; 429/127, 162, 181; 228/180 R, 116, 901

[56] References Cited

U.S. PATENT DOCUMENTS

| | | | |
|---|---|---|---|
| 1,259,485 | 1/1916 | Byrne | 29/623.2 |
| 2,798,895 | 7/1957 | Nowotny | 429/162 |
| 2,870,235 | 1/1959 | Soltis | 429/162 |
| 3,253,954 | 5/1966 | Banas | 29/623.2 |
| 3,900,341 | 8/1975 | Shoichiro | 29/623.2 |
| 4,319,708 | 3/1982 | Lomerson | 228/180 R |

*Primary Examiner*—Howard N. Goldberg
*Assistant Examiner*—P. W. Echols

*Attorney, Agent, or Firm*—Pahl, Lorusso & Loud

[57] ABSTRACT

In accordance with the invention, a novel electrochemical cell and a method for making same is provided which is particularly suitable for use in a battery of the type employing one or more cells. One feature of the cell includes a sealed non-metallic pouch of thin flexible material which forms a cell adaptable to varying battery configurations as well as cell shapes. A second feature of the cell includes a novel feedthrough arrangement wherein a pair of electrically conductive members are located on respective sides of an interjacent through-hole formed in the housing material. The pair of electrically conductive members are coupled through the through-hole to form the feedthrough. An electrode of anode material is electrically coupled to the internally located member of one feedthrough pair. An electrode of cathode material is electrically coupled to the internally located member of the other feedthrough. The cell further includes electrically insulative porous material for separating the electrodes, as well as a volume of electrolyte electrochemically coupling the electrodes.

7 Claims, 6 Drawing Figures

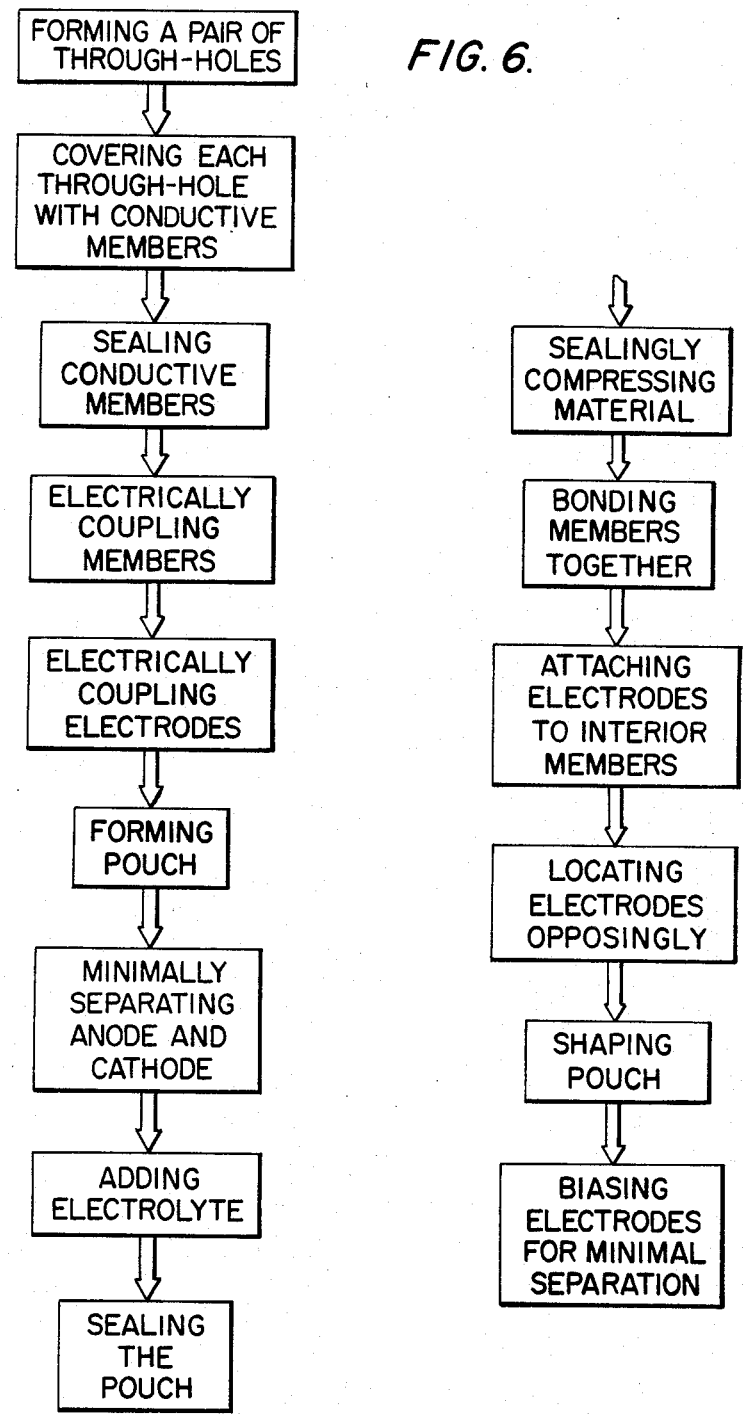

ELECTROCHEMICAL CELL

This invention relates to electrochemical cells. Electrochemical cells comprise an anode and a cathode electrochemically coupled by an electrolyte. Means such as porous, electrically non-conductive material is frequently placed between the anode and cathode to permit minimal electrode separation and a consequential minimum in internal cell resistance.

Electrochemical cells also include a cell housing which can be hermetically sealed or non-hermetically sealed. Electrical connection is made to the anode and cathode by means of terminals on the exterior of the housing. Some types of cells include an electrically conductive housing in physical contact with one of the electrodes so that the exterior of the housing substitutes for one of the terminals.

Those skilled in the art know that terminals are formed by feedthroughs which sealingly pass through the container. When a metal or other electrically conductive container is used, a glass-to-metal feedthrough is employed.

Some batteries employ a number of individually contained cells which are coupled to exterior battery terminals.

In accordance with the invention, a novel electrochemical cell and a method for making same is provided which is particularly suitable for use in a battery of the type employing one or more cells. One feature of the cell includes a sealed non-metallic pouch of thin flexible material which forms a cell housing of deformable configuration to render the cell adaptable to varying battery configurations as well as cell shapes.

A second feature of the cell includes a novel feedthrough arrangement wherein a pair of electrically conductive members are located on respective sides of an interjacent through-hole formed in the housing material. The pair of electrically conductive members are coupled through the through-hole to form the feedthrough.

An electrode of anode material is electrically coupled to the internally located member of one feedthrough pair. An electrode of cathode material is electrically coupled to the internally located member of the other feedthrough. The cell further includes means for separating the electrodes, as well as a volume of electrolyte electrochemically coupling the electrodes.

Additional features of the invention are disclosed in the following Description of a Preferred Embodiment, of which the following drawing is a part.

Figure 2:
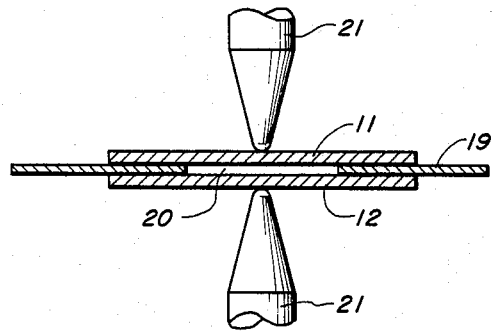
Figure 3:
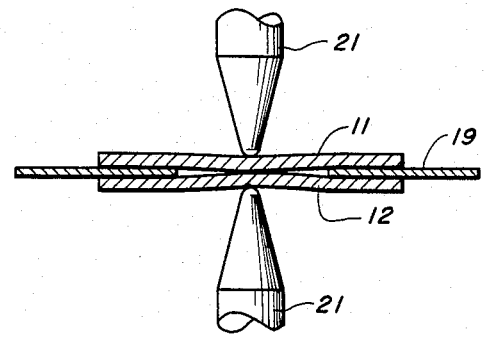
Figure 4:
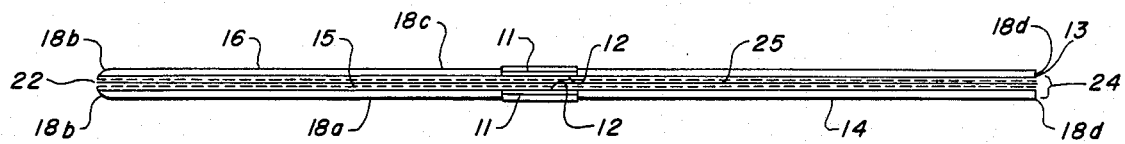
Figure 5:
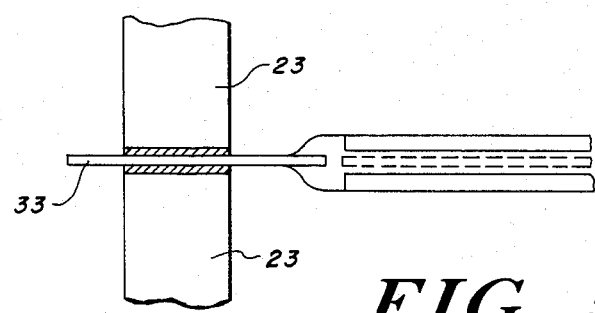

FIG. 1 is a plan view of a quantity of pouch material for use in constructing an electrochemical cell in accordance with the invention, FIGS. 2 and 3 are sectional elevation views in schematic taken along line 2—2 in FIG. 1 and illustrating the construction of a feedthrough in accordance with the invention, FIG. 4 is an elevation view showing the formation of the electrochemical cell in accordance with the invention, and FIG. 5 is an elevation view in schematic showing the sealing of an electrochemical cell in accordance with the invention, FIG. 6 is a block diagram of a process for forming an electrochemical cell in accordance with the invention.

In FIG. 1, a sheet 18 of pouch material is illustrated in a plan view. The material is preferably a plastic film of any of the thermoplastic polymers capable of being heat sealed to itself, such as polyethylene, polypropylene, PVC, nylon, Halar TM (Allied Chemical Co.), Tefzel TM (E. I. DuPont DeNemours & Co.), FEP, or PFA, and is, for example, approximately 0.002 inches thick. The sheet comprises four edges 18a, b, c, and d.

The sheet 18 is divided into two geometrically equal sections 19 by an imaginary dividing line 16. A through-hole 20 of, for example, $\frac{1}{8}$ inch diameter, is punched in the center of each section 19.

As shown in FIG. 2, a pair of electrically conductive discs 11, 12, formed, for example, from a material compatible with the electrochemical system such as nickel or stainless steel, are placed on opposite sides of the sheet 19 with one of the holes 20 interjacent the disc pair.

The discs are, for example, 0.010 inch thick and of greater diameter than the hole so as to contact the pouch material surrounding the hole. The discs 11, 12, are generally concentrically positioned to overlie the hole 20.

FIG. 3, the discs 11, 12, are pressed towards each other by electrodes 21 of a resistance welder with sufficient force to compress the pouch material surrounding the hole 20. With the pouch material thusly held in compression, additional compressive force is applied by the electrodes to resiliently deform the discs 11, 12, so that they contact each other through the hole 20. Upon such contact, the welder is activated, bonding the discs together through the hole 20. The pouch material surrounding the hole 20 is held in compression between the bonded discs forming a seal. As will become clear, the pair of sealingly engaging discs form a feedthrough. The feedthrough-forming process is repeated at the second of the holes 20 illustrated in FIG. 1 to form a second feedthrough.

Referencing FIG. 1 for convenience and imagining the top disc 11 of each pair to be seen respectively overlying an associated hole 20, a pair of electrodes (not shown) are electrically coupled to the discs 11. In the preferred embodiment, an electrode of anode material such as lithium foil is disposed directly onto the surface of one of the discs 11. Lithium foil is known to become "cold welded" to the surface of nickel or stainless steel members when a pressing force is exerted against the two.

An electrode of cathode material (not shown) such as, for example, carbon graphite is disposed onto the surface of the second disc 11. One method for coupling the graphite to the disc comprises the pressing of the graphite onto a mesh-like, electrically conductive substrate and welding, or otherwise bonding, the substrate to the surface of the second disc 11.

With the electrodes thus electrically and physically coupled to respective discs, the pouch material is folded along the line 16 by, for example, bringing the end 18c upward from the plane of FIG. 1, and to the left so that edges 18a and 18c are generally contiguous. In this configuration, the anode and cathode are facing each other from opposing pouch walls.

FIG. 4 illustrates a side elevation view of the configuration thus formed, conveniently taken from the left end of FIG. 1. Looking between edges 18a and 18c, towards the fold 16, two pair of discs 11, 12, are shown. The anode and cathode are coupled to respective interior discs 11. As will be clear, electrical connection to the anode and cathode will be made to respective external discs 12 which function as the terminals of the electrochemical cell.

Prior to sealing the pouch, a piece of electrically insulative porous material 25 is placed between the anode and cathode to minimally separate them while permitting electrochemical coupling therebetween by an electrolyte. The use of such separators is well-known in the art and a detailed discussion of the shapes, materials and sizes is not necessary to an understanding of the invention.

After placing of the separator 25 between the anode and cathode, the pouch is substantially sealed. Specifically, the two sides 18b, 18d are respectively sealed at 22, 24, by heat sealing. Accordingly, each side 18b, 18d is placed between the jaws 23 of an impulse heat sealer to form a leak-tight seam 22, 24.

Before the side opposite the fold, comprising edges 18a, 18c, is sealed, a thin wire 33 (FIG. 5) of approximately 0.5 mm diameter is inserted between the edges 18a, c, generally perpendicular thereto so that the wire protrudes from between the edges. The edges are then heat sealed and the wire withdrawn, leaving an opening through which the pouch will be filled with electrolyte.

The pouch may be conveniently filled with electrolyte by inserting the pouch into a vessel with the opening immersed in a pre-measured amount of electrolyte. The vessel is placed in a vacuum chamber and the pressure reduced. With the reduction in chamber pressure, the pressure in the pouch is also reduced. When the chamber is subsequently vented to atmosphere, electrolyte is forced by the higher pressure into the pouch.

After filling with electrolyte, the unsealed portions of edges 18a, c, forming the opening, are heat-sealed together.

The cell thus completed may now be interconnected to other similar cells within a battery and hermetically sealed within the battery container if desired.

The advantages of the described cell over known prior art cells are numerous. The shape of the pouch, for example, can be modified with very little change in components or tooling. For example, a round configuration may be provided or the dimensions changed by merely cutting or folding the sheet 18 (FIG. 1) differently. Design labor and capital equipment costs due to package modification are therefore minimal.

Owing to the simplicity of the fabrication technique, including feedthrough construction, the entire manufacturing process is easily automated.

An important safety-related feature of the described cell is a self-limiting current feature. Some electrochemical systems generate a significant amount of heat and/or pressure when excessive current is drawn from the cell. Excessive current may be drawn, for example, when an internal or external short circuit condition exists. The flexible pouch material of the aforedescribed cell permits an increase in the distance between opposing internal pouch walls in response to increased internal pressure when the pouch is appropriately dimensioned. The electrodes attached onto the opposing feedthrough discs 11 will accordingly become further separated, increasing the internal impedance of the cell and thereby limiting the current drained. Electrochemical cells of the type susceptible to explosion under short circuit conditions will benefit from the self-limitation of current.

Accordingly, the cell pouch can be held in compression by biasing means such as a spring or freon-filled bag, to maintain minimal electrode separation during normal operation. Maximum current may be drawn with optimum utilization of the electrochemically active materials. When a short circuit or other cause of excessive current drain arises, the expansion of the pouch overcomes the force generated by the biasing means. Upon a return to normal conditions, the biasing means returns the electrodes to their initial relative position after the cell has cooled sufficiently to reduce the internal pressure.

It should be appreciated that the foregoing description is intended to be illustrative rather than restrictive. While the foregoing description of the preferred embodiment is specific as to materials, shape and combinations of features, it is recognized that many permutations and modifications may be made by those skilled in the art who have had the benefit of these teachings. The invention herein is intended to be defined solely by the claims appended hereto which, in turn, are intended to be interpreted as broadly as permitted to include all such modifications and permutations and to be limited only by the prior art.

We claim:

1. A method for assemblying an electrochemical cell comprising the steps of
   (a) forming a pair of through-holes in a sheet of thin resilient non-metallic material;
   (b) placing each through-hole between a respective pair of overlying electrically conductive members;
   (c) sealing the members of each pair of conductive members to the non-metallic material surrounding the through-hole;
   (d) electrically coupling the members of each pair through the interjacent through-hole;
   (e) electrically coupling an anode and a cathode respectively to the electrically conductive member of a different member pair on one side of the non-metallic sheet;
   (f) forming the non-metallic material into a pouch;
   (g) providing for minimal separation of the anode and cathode;
   (h) adding electrolyte in electrochemical contact with the anode and cathode; and
   (i) sealing the pouch.

2. The method of claim 1 including the step of sealingly compressing the interjacent non-metallic material surrounding the through-hole between the electrically conductive members; and
   bonding the electrically conductive members together through the through-hole so that the interjacent non-metallic material is held in sealing compression therebetween.

3. The method of claim 2 including the step of attaching the anode and cathode onto the interior member of a respective member pair.

4. The method of claim 3 including the step of locating the anode and cathode on opposing interior faces of the pouch.

5. The method of claim 4 including the step of modifying the shape of the pouch to permit increased pressure within the pouch during cell operation to separate the electrodes from each other.

6. The method of claim 5 including the step of biasing the electrodes for minimal separation during predetermined operating pressures.

7. The method of claim 1 wherein the non-metallic material is a thermoplastic polymer and the pouch is sealed by applying heat to the plastic to form a heat-sealed seam.

* * * * *